*INVENTOR.*
CELSO L. MALASPINA
NOW BY JUDICIAL CHANGE OF NAME,
C. L. MARSHALL

William F. Nickel
ATTORNEY

Patented Feb. 1, 1949

2,460,701

UNITED STATES PATENT OFFICE 2,460,701

ROD OR PIPE CLAMP

Celso L. Malaspina, Tuckahoe, N. Y., now by judicial change of name Charles Louis Marshall Application July 12, 1946, Serial No. 683,106

5 Claims. (Cl. 24—254)

1

This invention is an improvement in holders; and particularly holders for use in places like chemical and physical laboratories for bodies that are elongated in shape, such as burettes and other articles of laboratory equipment.

An object of the invention is to provide a holder by which a burette or similar vessel can be quickly and securely gripped and supported in upright position, and from which it can be easily dismounted whenever removal is necessary. The holder is simple and inexpensive to construct and includes upper and lower fixed arms, each bearing a grooved wheel at its outer end, and upper and lower movable arms each associated with one of the fixed arms and each carrying a grooved wheel similar to the wheels first mentioned. The movable arms lie between the fixed arms; and the wheel on each and the wheel on the adjacent fixed arm make a pair. The holder comprises means engaging the movable arms to force the wheels thereon into operative position with respect to the other wheels. To mount the burette it is then only necessary to pull the movable arms so as to separate the wheels of each pair and then slip the burette between them. When released, the two movable arms are moved by said means to clamp the burette between the wheels and retain it as long as it is needed for any desired test or operation. Also, since the wheels can rotate on their journals or pivots, vertical adjustment of the burette in the holder is permitted.

The drawings show one form of the invention but in practice I may of course resort to other forms with variations in details, of size, shape and arrangement of parts, without departing from the essential character of the invention.

Figure 1:
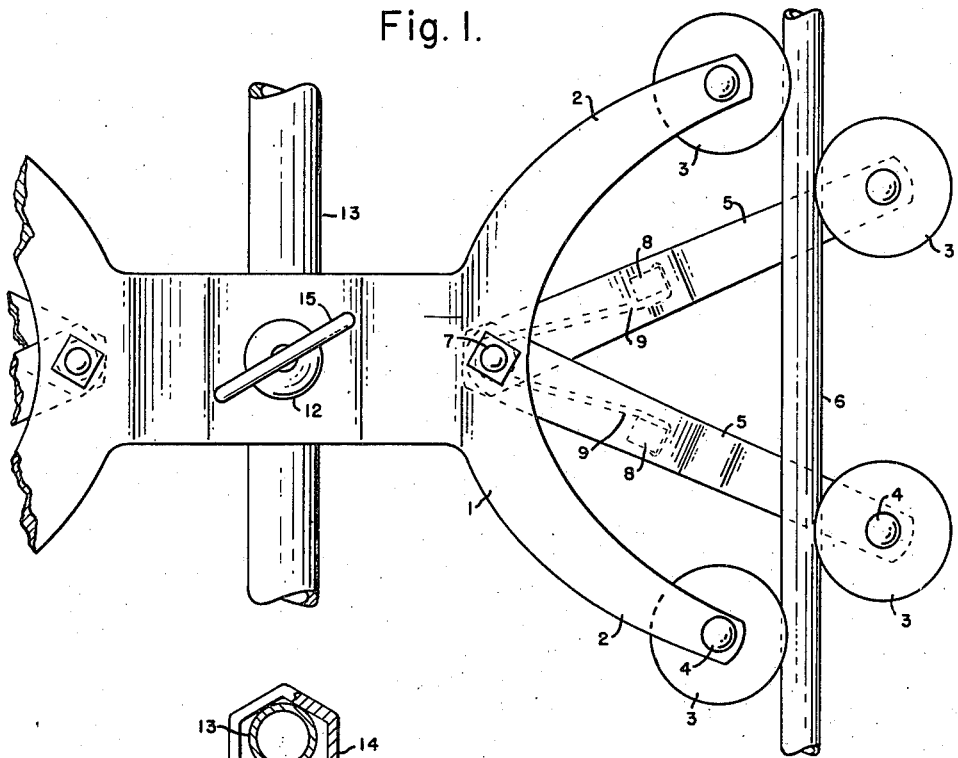
Figure 1 is a side view of a holder according to this invention.
Figure 2:
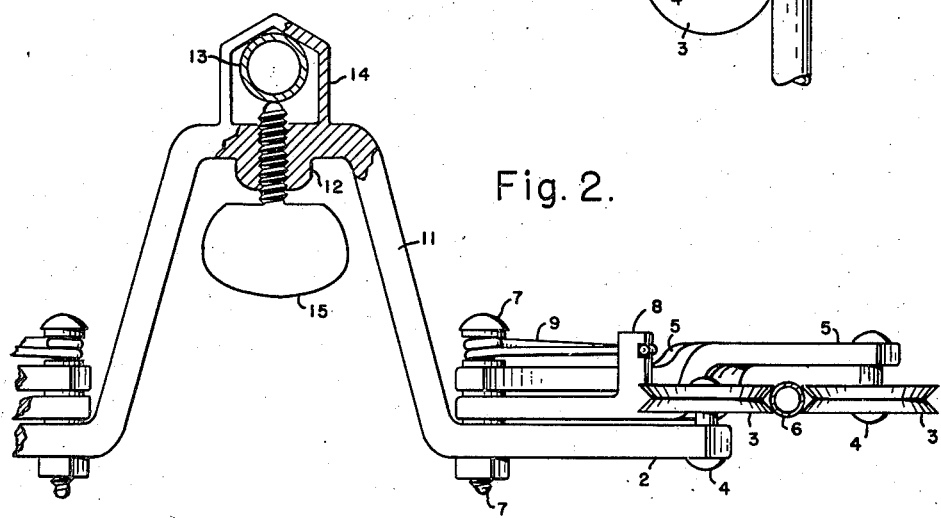
Figure 2 is a top plan thereof.

The holder comprises a yoke 1 having a pair of fixed arms 2, one above the other. At the outer end of each of these arms is a grooved wheel 3 that can turn on a journal 4, these wheels being in substantially the same vertical plane. The yoke also carries a pair of movable arms 5, one above the other, which lie between the fixed arms 2. These arms 5 have a common axis or pivot about which they are swung, and each of them likewise carries at its outer end a grooved wheel 3 mounted on a journal 4; and the arms 5 are so shaped that the wheels thereon lie in the same plane as the wheels 3 on the arms 2. Thus there are two pairs of wheels 3, each pair

2 comprising a wheel on an arm 2 that does not change position though free to rotate on its journal; and the other comprising a similar rotatable wheel on one of the arms 5 that changes position when this arm is moved, so that it can be retained close to the wheel associated therewith or separated therefrom. The burette is indicated at 6.

As stated above, the movable arms 5 are each mounted on a common pivot or journal 7 which is affixed to the base of the yoke 1. Each movable arm also carries a stud 8 at a short distance from the pivot 7, and this pivot and the studs bear a bent generally U-shaped spring 9. This spring has one or more complete turns at the middle encircling the pivot 7 of the yoke 1. Its outer ends are bent around the studs 8 and this spring is normally set so that it forces the two arms 5 to move the wheels 3 thereon into contact with the wheels on the arms 2. Since the arms 5 are between the arms 2, the action of the spring 9 is to spread the arms 5, and when the burette is to be mounted in the holder the arms 5 must be moved toward each other by hand. This action separates the wheels of the upper pair and lower pair a sufficient distance to permit the burette to be slipped into the space between the wheels of each pair. The arms 5 are then released and the spring 9 then moves the pivoted arms so as to cause the wheels thereon to move back and clamp the burette between them and the wheels on fixed arms 2. The burette is not only held firmly but it can be moved up and down into any position desired.

The yoke has a bent shank 11 with a bent end having a bearing 12. On the other face of the shank is a band 14. The holder is mounted on a vertical post or stand 13 passing between the shank 11 and band 14 and held by a binding screw 15 which passes through the bearing and grips the rod between this bearing and the band 14. Thus the yoke can be moved up and down and attached to the stand 13 at the desired height. The yoke can be made in the form of a double member with arms and wheels at each side of the post, so that two burettes or the like can be supported thereby.

From the foregoing description it will be seen that the invention is well calculated to serve the purpose for which it is designed.

Having described the invention what I believe to be new is:

1. A holder comprising a yoke-shaped member having upper and lower arms, with grooved wheels at the ends thereof, movable arms pivoted to said yoke between the arms thereof, each of said movable arms being associated with one of the arms of the yoke and projecting beyond same, the movable arms each carrying a wheel at the outer end in position to cooperate with one of the first named wheels, and means engaging said movable arms for normally holding same in position to grip a vessel between the wheels thereon and the wheels on the fixed arms.

2. The holder according to claim 1 wherein said movable arms have a common pivot on the yoke between said fixed arms.

3. The yoke according to claim 1 wherein said yoke has a stud between the adjoining ends of the fixed arms, a spring encircling said stud, and studs on the movable arms engaged by said spring to hold said arms in operative position.

4. A holder comprising a yoke-shaped member having upper and lower fixed arms with grooved wheels at the ends in substantially the same vertical plane, movable arms between the fixed arms and pivoted on said yoke and extending beyond said fixed arms, the movable arms each carrying a grooved wheel in a substantially vertical plane in position to cooperate with one of the wheels on the fixed arms and means engaging said yoke and movable arms to retain the latter in position to grip a vessel between the wheels on the movable arms and the wheels on the fixed arms.

5. The holder according to claim 4, wherein said means comprises a U-shaped spring mounted on the yoke with its ends connected to said movable arms.

CELSO L. MALASPINA.

No references cited.